Oct. 15, 1929. A. SCHOELLER Re. 17,460

ELECTRIC CIGAR LIGHTER

Original Filed May 6, 1926

Inventor

Alfred Schoeller,

By James L. Morris

Attorney

Reissued Oct. 15, 1929 Re. 17,460

UNITED STATES PATENT OFFICE

ALFRED SCHOELLER, OF FRANKFORT-ON-THE-MAIN, GERMANY

ELECTRIC CIGAR LIGHTER

Original No. 1,622,263, dated March 22, 1927, Serial No. 107,083, filed May 6, 1926, and in Germany July 6, 1925. Application for reissue filed December 29, 1928. Serial No. 329,231.

This invention relates to improvements in electric cigar lighters, and more especially to those of the class embodying a heating wire carrier which is removably mounted on a base or casing and is adapted to be manipulated thereon so as to receive electric current for heating the heating wire after which the carrier containing the heated wire may be removed for use, and the main object of the invention is to provide a novel and improved lighter of this class wherein the manipulation thereof is simplified and facilitated and the device is rendered more convenient for use, it being necessary to simply tip or rock the heating wire carrier relatively to the base, while the carrier is mounted thereon, in order to supply electric heating current to the heating wire, after which the carrier containing the heated wire may be detached from the base and used.

Electric lighters are known which comprise a carrier for the heating wire removably mounted in a contact casing and adapted to be switched into the circuit by being moved in this casing. In cigar lighters of this type and of known construction, which are operated by one hand, the carrier of the heating wire must be displaced in axial direction in opposition to the action of a spring to switch the same into the circuit. As soon as the pressure ceases, the carrier of the heating wire is automatically cut out so that it can be removed from the casing and used for lighting a cigar.

Electric cigar lighters of this type possess all the inconvenience that, if any person should accidentally press on the cigar lighter the circuit might be closed so that the garment of the person is damaged or the cigar lighter destroyed.

According to the particular form of the invention shown, the holder of the heating wire carrier is elastically mounted in the contact casing opposite the current supply contacts so that it has to be tipped, turned or placed on edge in the contact casing for closing the circuit. When released, the holder returns instantaneously into the cutout position. Owing to the tipping, turning or placing on edge of the removable heating wire carrier the danger is considerably reduced that, by accidental depression of the carrier, the circuit be closed.

The carrier for the heating wire is inserted into the contact casing perpendicularly to the central line of the casing and the carrier can consequently be made flatter than this would be otherwise the case, and the heating wires are visible from the outside.

In the drawing a form of construction of the invention is shown by way of example:—

A is a carrier in which a heating wire B, adapted to be heated in consequence of its resistance to the flow of an electric current therethrough, is located. The carrier A has on its bottom plate a button-shaped circumferentially grooved extension D of metal which is to be inserted into the open end of a slot formed in a frame-like holder H of the contact casing C which forms part of the stationary base of the lighter. This holder H is yieldably mounted by means of a pivot pin L which is suitably supported within the casing and connected to the holder H toward one of its ends, it extending behind and perpendicularly to the length of the slot therein, and is acted on by a spring M. The spring M bears at the one end onto the slotted holder H and at the other end onto the bottom plate F of the casing. The contact spring E is fixed to the slotted holder H. Between the bottom plate F and casing C an insulating plate O of cardboard is inserted, so that one of the branches of the circuit is formed by the casing, and the other branch of the circuit, which includes the slotted holder H and contact spring E, is insulated from the casing, and the front wall of the casing is formed with a slot F′ which extends parallel with and is larger than the slot in the holder H so that the extension D on the carrier A may extend through the slot F′ while engaged with the holder, without making electrical contact with the casing. The button-like extension D is insulated from the outer body portion of the carrier A and is electrically connected by the conductor *d* to one end of the heating wire B, the other end of said heating wire being connected by the conductor *a*, to the outer body portion of the carrier A.

Figure 3:
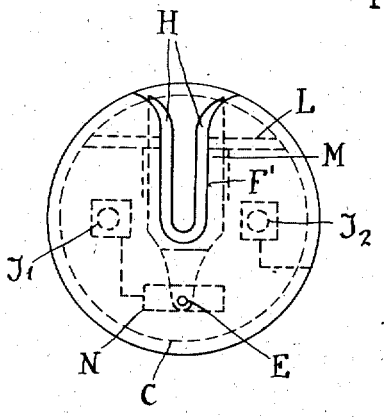
Fig. 3 shows in plan view the casing, the carrier of the heating wire being removed.

As shown in Fig. 3 the contact plug I′ is electrically connected to a contact coating N which is mounted in the casing insulated from the same and opposite the contact spring E. The second contact plug $I^2$ is connected to the mass of the casing.

Figure 1:
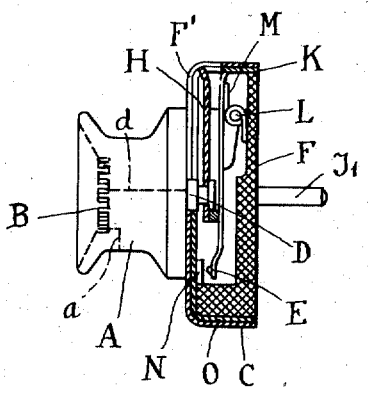
Fig. 1 shows the cigar lighter in the position of rest, the casing being shown in section.
Figure 2:
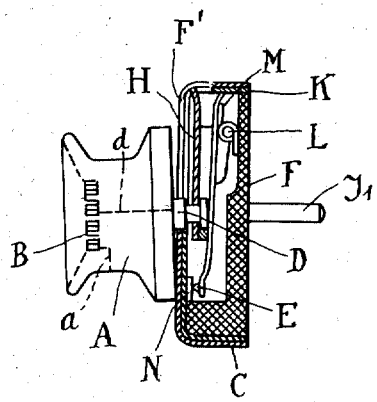
Fig. 2 shows the cigar lighter in the switched-in position.

The operation is as follows: In Fig. 1 the contact spring E is in the position of rest spaced from the contact coating N. When the carrier A of the heating wire is tipped, as shown in Fig. 2, the blade spring E comes into touch with the contact coating N, since the holder H to which it is fixed, is drawn forwardly by the button-shaped extension D engaging it, and at the same time, an edge of the body of the carrier A is in electrical contact with the face of the casing C, so that current flows through the heating spiral B between one side of the electric circuit which is connected to the casing C, and the other side of said circuit which is connected to the spring E insulated from the casing. As soon as the heating wire has been sufficiently heated, the carrier A is pulled out if the slotted holder H and used for lighting a cigar.

After use the carrier A is re-inserted into the slotted holder H so that it re-assumes the position shown in Fig. 1, the heating wire B being cut out and maintained normally in an open circuit, since the spring M draws the contact spring E out of contact with the contact surface N and yieldingly holds it out of contact therewith until the carrier A is again tipped.

I claim:—

1. Electric cigar lighter comprising in combination, a contact casing, a blade spring in said contact casing, a holder yieldably mounted in said casing opposite said contact spring, a carrier in said holder, a heating wire in said carrier, a contact coating in said casing, and a contact spring connected with said blade spring for said holder and having a contact pin opposite said contact coating so that said holder has to be tipped, turned or placed on edge for closing the circuit for the heating wire.

2. An electric cigar lighter comprising a base, a heating resistance carrier removably and yieldingly mounted on the base, and electric contacts controlling an electric circuit for the heating resistance, said carrier being yieldable into a tipped position relatively to the base and operative on said contacts, when tipped, to close the circuit through the heating resistance.

3. An electric cigar lighter comprising a base, and a heating resistance carrier removably mounted on the base and yieldingly held in a predetermined normal position thereon, the heating resistance having an electric circuit including controlling contacts which are separated while the carrier is in its said normal position, said carrier being yieldable with respect to the base into a relatively tipped position where it will cause engagement of said contacts and closing of the electric circuit through the heating resistance.

4. An electric cigar lighter comprising a stationary casing having electric contacts thereon, and a heating resistance carrier removably mounted on the casing and having electric contacts to cooperate with those on the casing, the heating resistance having an electric circuit which includes said contacts, said carrier being movable into a tipped position with respect to the casing and thereby operative to close the electric circuit through the heating resistance, and means operative to automatically return said carrier to a normal position, when released after being tipped, to thereby open the circuit through the heating resistance.

In testimony whereof I have hereunto set my hand.

ALFRED SCHOELLER.